A. A. LAWRENCE.
METHOD OF DRY PICKLING SEED GRAIN.
APPLICATION FILED MAY 12, 1920.
1,409,144.
Patented Mar. 7, 1922.
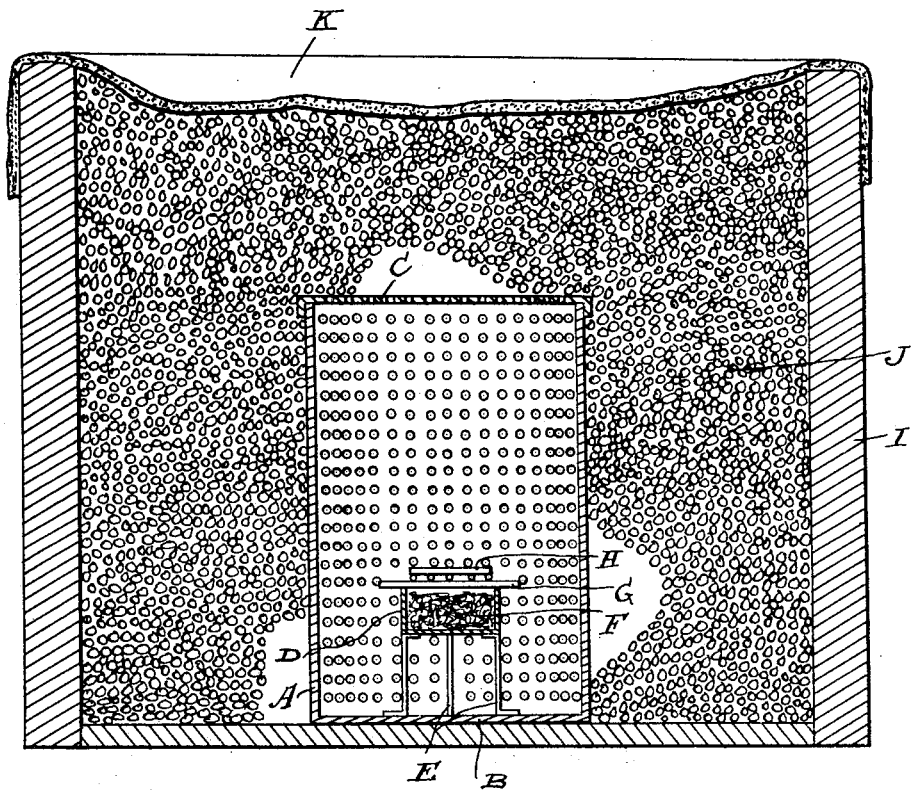

UNITED STATES PATENT OFFICE.

ALBERT ARTHUR LAWRENCE, OF REGINA, SASKATCHEWAN, CANADA, ASSIGNOR TO JOHN FOX, OF REGINA, SASKATCHEWAN, CANADA.

METHOD OF DRY-PICKLING SEED GRAIN.

1,409,144.  Specification of Letters Patent.  Patented Mar. 7, 1922.

Application filed May 12, 1920. Serial No. 380,865.

*To all whom it may concern:*

Be it known that I, ALBERT ARTHUR LAWRENCE, a subject of the King of Great Britain, residing in the city of Regina, in the Province of Saskatchewan, Dominion of Canada, have invented certain new and useful Improvements in Methods of Dry-Pickling Seed Grain, of which the following is a specification.

My invention relates to improvements in method of dry pickling seed grain, and the object of my invention is to destroy all germs carried by the grain by means of a suitable gas, so that a very few minutes after the grain has been so pickled, the same may be ready for sowing, and in the following specification, I shall disclose a very simple device whereby my process may be put into operation, and what I claim as new will be set forth in the claim forming part of this specification.

It is now practically a universal custom to pickle seed grain by immersing it in a suitable pickling liquid, and to utilize this wet process there necessarily is employed a suitable apparatus, more or less relatively expensive. While the wet pickling process is efficient, still it necessarily is a disagreeable one to carry out, and as the grain after pickling has to be sufficiently dried in order that it may be sown, more time than is necessary is required after the pickling of the grain, before it can be sown. My dry process of pickling reduces this time to a minimum.

The drawing represents a vertical cross section through a suitable device for putting my process into operation, showing the same embedded in a body of grain contained in a wagon-grain box for example, and covered over to keep the gas from escaping.

In putting my method into operation, the gas producing means is embedded in the body of seed grain to be pickled, after the fumigating element has been caused to generate gas or fumes, and as the fumigating element is mounted within a suitable apertured vessel, the gas or fumes escapes from said vessel into the body of surrounding grain and fills the interstices between the particles of grain, thereby completely surrounding each seed or grain and effecting the object in view. The body of grain undergoing pickling is covered over or enclosed by any suitable means so as to ensure that the gas will be forced into the space between each seed or grain.

A suitable device to carry out the process set forth comprises a vessel A, the walls of which are apertured in any suitable manner. The bottom B of this vessel is imperforate, while the cover C is apertured. D is any suitable vessel supported within the vessel A by legs E or otherwise, and said vessel D is designed to contain asbestos waste F, which is to be given a small quantity of wood alcohol. Supported above the vessel A on any suitable support G, is the fumigating element H, such as a cake of formaldehyde. The wood alcohol is ignited and afterwards the cover C placed in position, and then the device is embedded in a body of grain. The gas or fumes of course, escape from the apertured vessel A and pass into the body of grain as before set forth.

The wagon-grain box I is shown as containing a body of grain J undergoing treatment, and in order to retain the gas or fumes in the body of grain, the same is covered over by any suitable means. A convenient cover for the body of grain may be a blanket K.

The vessel D supported as described and the supporting means for the cake or tablet H are located preferably centrally of the vessel A so that the sides of the vessel A will not be heated sufficiently to radiate heat to the grain.

Any well-known form of fumigator may of course be mounted within an apertured vessel, such as the vessel A, and any suitable fumigating element may be used.

What I claim is:

The method of treating grains while relatively at rest consisting of placing a body of untreated grain in a container, then placing a removable cover on the open side of the container to overlie the grain, then placing in said body of grain upon the floor of the container, a relatively large perforated active fumigator with the grain having the fumigator intimately embedded therein, with the gas generated by the fumigator escaping by the perforations and into and through said body of grain with the gas confined within the body of grain by the container covering.

ALBERT ARTHUR LAWRENCE.